(12) United States Patent
Urdang

(10) Patent No.: US 9,632,837 B2
(45) Date of Patent: Apr. 25, 2017

(54) SYSTEMS AND METHODS FOR SYSTEM CONSOLIDATION

(71) Applicant: Level 3 Communications, LLC, Broomfield, CO (US)

(72) Inventor: Erik Gwyn Urdang, Boulder, CO (US)

(73) Assignee: LEVEL 3 COMMUNICATIONS, LLC, Broomfield, CO (US)

(*) Notice: Subject to any disclaimer, the term of this patent is extended or adjusted under 35 U.S.C. 154(b) by 190 days.

(21) Appl. No.: 13/835,286

(22) Filed: Mar. 15, 2013

(65) Prior Publication Data

US 2014/0282627 A1    Sep. 18, 2014

(51) Int. Cl.
| | | |
|---|---|---|
| G06F 3/00 | (2006.01) | |
| G06F 9/44 | (2006.01) | |
| G06F 9/46 | (2006.01) | |
| G06F 13/00 | (2006.01) | |
| G06F 9/50 | (2006.01) | |

(52) U.S. Cl.
CPC .................. G06F 9/5061 (2013.01)

(58) Field of Classification Search
None
See application file for complete search history.

(56) References Cited

U.S. PATENT DOCUMENTS

| | | | |
|---|---|---|---|
| 7,260,599 B2* | 8/2007 | Bauch et al. | 709/202 |
| 7,904,916 B2* | 3/2011 | Branson et al. | 719/328 |
| 2010/0223231 A1* | 9/2010 | Lee | 707/610 |
| 2011/0119689 A1* | 5/2011 | McCrae et al. | 719/328 |
| 2013/0179942 A1* | 7/2013 | Caplis et al. | 726/3 |

* cited by examiner

*Primary Examiner* — Tuan Dao
*Assistant Examiner* — William C Wood

(57) ABSTRACT

Aspects of the present disclosure disclose systems and methods for consolidating business assets currently being employed by the enterprise to perform business tasks. In various aspects, a well defined application programming interface ("API") may be generated or otherwise provided that enables access to portions of an enterprise's assets and subsequently exposes such business assets in a standard format to requesting applications.

9 Claims, 4 Drawing Sheets

SYSTEMS AND METHODS FOR SYSTEM CONSOLIDATION

TECHNICAL FIELD

Aspects of the present disclosure relate to methods and systems for integrating and consolidating heterogeneous technologies and/or applications used within a central entity, such as a business enterprise.

BACKGROUND

Many businesses operate using a variety of older heterogeneous technologies, business applications, and other technological business resources, collectively known as "legacy systems," to perform different business transactions. For example, legacy systems may be used for consumer transactions, payroll systems, and business data management. In order to meet the changing needs of a business, legacy systems are gradually modified and extended over many years, and often become fundamental to the performance and success of the business.

It is often the case that such legacy systems cannot be efficiently replaced due to their complexity, size, fragmented nature, and/or interconnections with other systems. However, as the modern economy becomes more technologically complex and business requirements and opportunities change, many businesses require cross-enterprise collaborations among existing legacy systems and other business technologies, applications, and resources, as well as integration with new external technologies and systems, such as business-to-consumer and/or business-to-business applications. Similarly, an organization often inherits various systems from corporate acquisitions or acquires systems that become unsupported over time. Integrating these systems into existing infrastructure and maintaining these systems may involve redundant functionality and data, and eliminating those redundancies can be difficult and expensive. Conventionally, integrating, reducing and eliminating redundancies, and/or extending existing business technologies and applications, or integrating existing business technologies and applications with newer systems is difficult because of inconsistent interfaces, fragmented, differently formatted, and/or redundant data sources, and inflexible architectures.

It is with these problems in mind, among others, that various aspects of the present disclosure were conceived.

SUMMARY

Aspects of the present disclosure include a consolidation system. The system comprises at least one processor configured to generate an application programming interface for exposing at least two business assets to at least one requesting application. The at least one processor is further configured to consolidate the at least two business assets into at least one business asset without modifying the implementation of the application programming interface and the implementation of the at least one requesting application.

Aspects of the present disclosure include a method for enabling business asset consolidation. The method includes one or more steps executable by at least one processor. The steps include generating an application programming interface for exposing at least two business assets to at least one requesting application. The steps further include consolidating the at least two business assets into at least one business asset without modifying the implementation of the application programming interface and the implementation of the at least one requesting application.

Aspects of the present disclosure include a non-transitory computer readable medium encoded with instructions for enabling business consolidation. The instructions, executable by a processor, include generating an application programming interface for exposing at least two business assets to at least one requesting application. The instructions further include consolidating the at least two business assets into at least one business asset without modifying the implementation of the application programming interface and the implementation of the at least one requesting application.

BRIEF DESCRIPTION OF THE DRAWINGS

The foregoing and other objects, features, and advantages of the present disclosure set forth herein will be apparent from the following description of particular embodiments of those inventive concepts, as illustrated in the accompanying drawings. It should be noted that the drawings are not necessarily to scale; however, the emphasis instead is being placed on illustrating the principles of the inventive concepts. Also, in the drawings the like reference characters refer to the same parts throughout the different views. The drawings depict only typical embodiments of the present disclosure and, therefore, are not to be considered limiting in scope.

DETAILED DESCRIPTION

Figure 1:
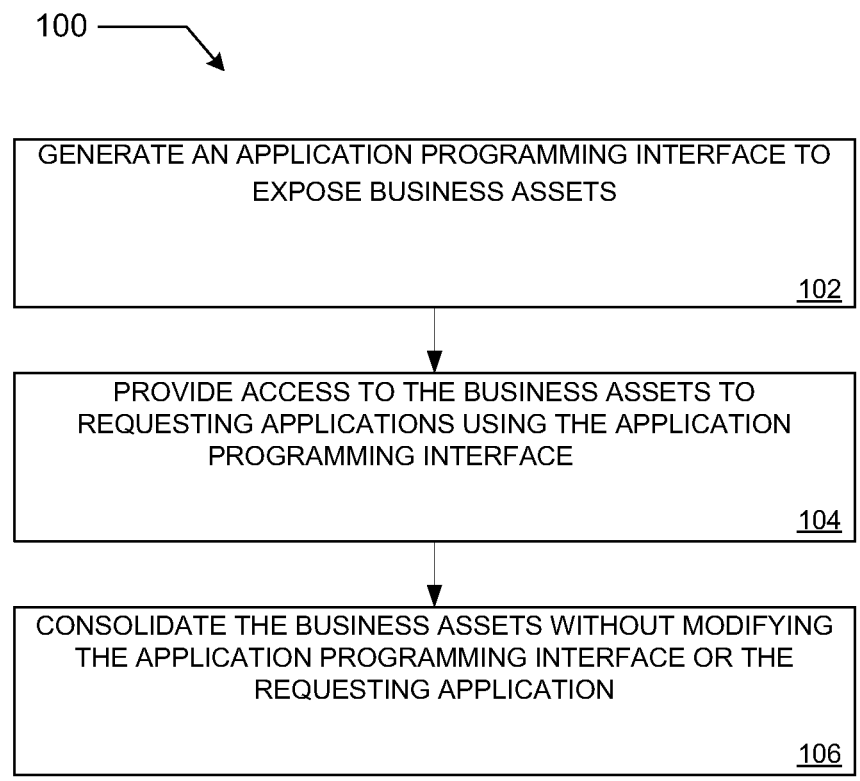
FIG. 1 is a flowchart illustrating an example process for consolidating systems, according to aspects of the present disclosure.

Aspects of the present disclosure involve systems and methods for providing enterprises with the ability to consolidate applications, datasets, and the like, currently being employed by the enterprise to perform business tasks. In various aspects, a well defined application programming interface ("API") may be generated or otherwise provided that enables access to portions of an enterprise's applications, which may be legacy applications, unsupported applications, and the like, and datasets. The API may be used to expose the enterprise applications and/or datasets to one or more requesting applications for consumption. For example, the API may expose a legacy application and its dataset to a user-interface for displaying and otherwise interacting with the dataset (e.g. a graphical user-interface). As a result of using the API to expose the enterprise applications and/or datasets to other requesting applications, enterprise developers may consolidate the datasets and/or applications of the enterprise without making any modifications to the requesting applications accessing such datasets and/or applications.

Many business enterprises operate using a variety of business computing assets, which refer to any disparate, external, internal, custom, and/or proprietary business software application, database, dataset, database system, technology, system, packaged commercial application, file system, or other type of technology component capable of performing business tasks or providing access to business data. In many cases, such businesses have more business assets than are required to achieve the business's computing requirements and many of such computing assets are inefficient, expensive, or outdated. For example, it is common for a business enterprise, particularly a large enterprise, to have hundreds of legacy applications and databases that serve critical business needs, but have not been converted to newer, more efficient systems. Additionally, it is common for a business enterprise to have obtained, such as when acquiring another company or expanding divisions without sophisticated IT support, dozens of applications with overlapping and redundant functionality. Finally, some enterprises have custom applications that are not poorly understood by current IT personal, such as when IT personal no long with the company developed the application, to perform business tasks that are also poorly understood by current IT personnel, either or both of which makes such applications difficult to replace or retire.

Overlapping functionality, multiple instances of core applications, and the like all contribute to business inefficiencies including performance degradation, increased hardware and maintenance costs, and increased liability, and further, provide opportunities for consolidation to a more well-defined enterprise architecture. Enterprise business asset consolidation includes both application consolidation and dataset consolidation. Application consolidation refers to reducing redundancies in application functionality by consolidating business applications into an integrated package capable of performing a core set of functions. As a result of the consolidation, each application within the package may be run independently using the same set of hardware resources in an efficient manner. Dataset consolidation generally refers to the process of consolidating data into a centralized database, database system and/or data store that is managed by a single system. Dataset consolidation results in the ability to link data between business assets and the ability to perform operations on such data that were not possible when the data was siloed, disparate and/or inaccessible, and also provides enhanced efficiencies by reducing or eliminating unnecessary redundancies.

Aspects of the present disclosure enable the consolidation of business assets by providing a standard, well-defined API between client systems (e.g. applications requiring or requesting access to business assets) and one or more business assets. The client systems may gain such access by consuming or otherwise using the standard API that effectively abstracts or hides the implementation details of the business assets in which the client system is interested in consuming. Once a connection between a client system and the API has been established, any consolidations made to the business assets may occur without risk to the client systems accessing the business assets.

Figure 2:
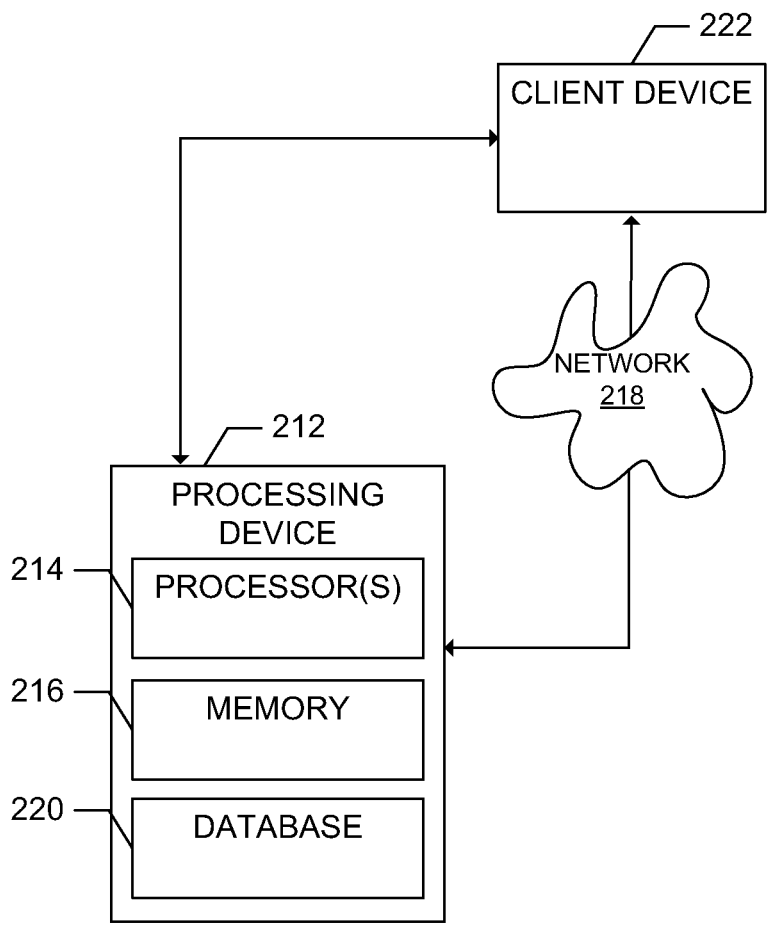
FIG. 2 is a block diagram of a computer system for consolidating systems, according to aspects of the present disclosure.

An illustrative process for enabling consolidation of business assets is depicted in FIGS. 1-2. In particular, FIG. 1 illustrates an example process or method 100 for enabling the consolidation of business assets and FIG. 2 illustrates a computing environment 200 including various hardware systems and/or software components that may be used to perform or otherwise execute the process or method 100.

Referring now to FIG. 1, process 100 begins with generating an API for exposing business assets (operation 102). An API is a type of protocol or specification that is used as an interface by software components to communicate with each other, as is generally known to one of ordinary skill in the art. Typically, an API includes a specification for routines, data structures, object classes, and variables, all of which may be used by software to communicate with other software. The API may be well-defined, static, and/or implemented according intended future capabilities. Stated differently, the API acts as a contract between applications and their clients and the clients depend on the immutability of the API over time, effectively enabling the client to always communicate with its desired application.

When used in the context of web development, an API is referred to as a "web service" or "web service API" and typically defined as a set of Hypertext Transfer Protocol ("HTTP") request messages, along with a definition of the structure of response messages, such as for example, in an Extensible Markup Language ("XML") or JavaScript Object Notation ("JSON") format. A common paradigm used for developing web services is a representational state transfer ("REST") software paradigm or architecture. A REST architecture abstracts the implementation details of the different architectural elements of a distributed network system, such as servers, clients, gateways, proxies, etc., and provides a standard way for such components to communicate. In particular, the REST architecture consists of clients and servers. The clients initiate requests to servers which process the requests and return appropriate responses. A hypertext transfer protocol ("HTTP") is used to initiate the requests and responses between the clients and servers in a REST architecture.

In one particular embodiment, the generated API may expose compression algorithms (as are generally known in the art) through the API, as may business assets may require lossless data compression and decompression. For example, Each compression algorithm has a set of properties that controls its behavior. While main embodiments are described according to the REST architecture, it is contemplated that other service based paradigms and or architectures may be used, such as a simple object access protocol ("SOAP"), TIBCO and the like. Moreover, the API may be implemented using or otherwise in accordance with straight-forward signature calling, standardized return values (i.e. what objects are returned and how intuitive and accessible the objects are), and in the context of web service, payload size.

As illustrated in FIG. 2, the API may be generated by a processing device 212, which may be a personal computer, work station, server, mobile device, mobile phone, processor, and/or other type of processing device and may include one or more processors 214 that process software or other machine-readable instructions. The processing device 212 may further include a memory 216 to store the software or other machine-readable instructions and data and a communication system to communicate via a wireline and/or wireless communications, such as through the Internet, an intranet, and Ethernet network, a wireline network, a wireless network, and/or another communication network. The processing device 212 may include a database 220, which is a general repository of data including business data, business asset data, API data, and/or any other data relating to consolidating business assets. The database 220 may include memory and one or more processors or processing systems to receive, process, query and transmit communications and store and retrieve such data. In another aspect, the database 220 may be a database server.

Referring again to FIG. 1, in one embodiment, one or more applications (e.g. an application, applet, program, source code, and the like) may be integrated, combined, connected, or otherwise implemented to consume the generated API, effectively enabling the one or more applications access to the business assets (operation 104). More particularly, the source code of any such applications, may include, for example, various function calls, routines, processes, and/or data structure declarations, as defined by the API, that access the various business data assets of the enterprise for which the API was generated. For example, in one particular embodiment, the generated application may be a graphical user-interface including various interactive elements, such as buttons, forms, fields, selections, inputs, streams, etc., capable of presenting or otherwise displaying data stored within the business assets of the enterprise.

As illustrated in FIG. 2, a user may access a client device 222 to initiate a request for accessing the one or more applications, which may be received by the processing device 212 (operation 108). In response, the processing device 212 may transmit instructions that may be processed and/or executed to provide an instance of the one or more applications currently accessing one or more business assets using the generated API. The client device 216 may be a personal computer, work station, server, mobile device, mobile phone, tablet device, processor, and/or other processing device capable of implementing and/or executing server processes, software, applications, etc. Additionally, the client device 216 may include one or more processors that process software or other machine-readable instructions and may include a memory to store the software or other machine-readable instructions and data. The client device 216 may also include a communication system to communicate with the various components of the processing device 212 via a wireline and/or wireless communications, such as through a network 218, such as the Internet, an intranet, an Ethernet network, a wireline network, a wireless network, a mobile communications network, and/or another communication network.

Subsequent to any application (e.g. a requesting application) retrieving access to the various business assets of the enterprise via the API, any consolidation of the business assets will not require a corresponding change to such applications. Stated differently, the enterprise may begin consolidating business assets while the application is still accessing the business assets using one or more aspects of the generated API. Accordingly, as illustrated in FIG. 1, one or more business assets may be consolidated (operation 106). The processing device 212 may merge business assets, eliminate duplicate functionality, etc. For example, multiple databases containing similar business data may be merged into a single database. In particular, data from the multiple databases may be merged into a single dataset and subsequently stored in a single database, database system or other type of data store and the remaining database may be phased out or replaced. Subsequently, any databases no longer being used by the enterprise may be disassociated from the API. In another example, multiple applications currently being executed by an enterprise that provide redundant functionality may be reduced to a single application (all but one application may be retired). Any of such consolidation efforts made to the business assets will not affect the requesting application's ability to access the business asset data and/or functionality.

Figure 3:
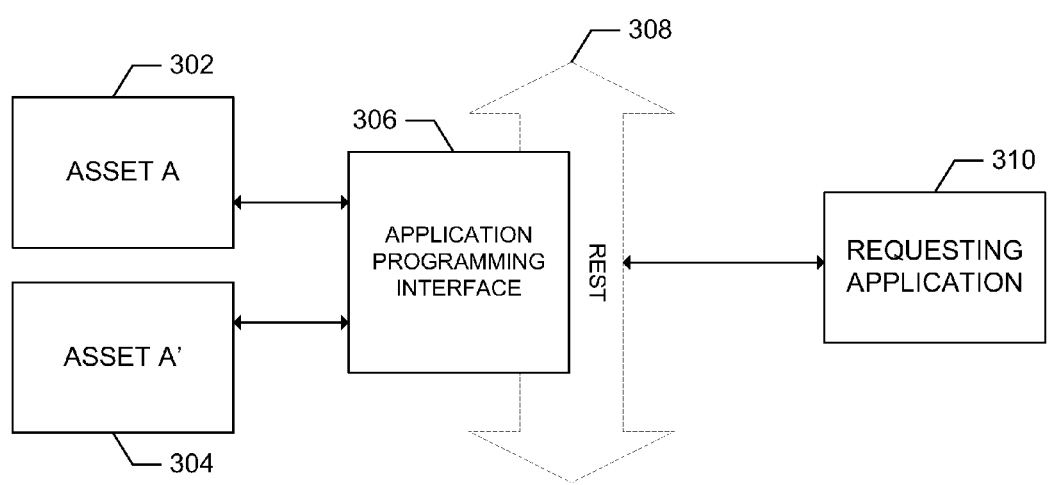
FIG. 3 is a block diagram illustrating an example consolidation, according to aspects of the present disclosure.

FIG. 3 is an example illustration of consolidating business assets, according to one embodiment. Assume a telecommunications service provider enterprise is currently using two different and disparate business assets in the form of product catalogs, A and A' (302 and 304), each of which are configured to manage product data corresponding to one or more telecommunication products currently being offered by the telecommunications service provider that generally relate to data, voice, security, video, etc. The product catalogs A 302 and A' 304 provide identical functionality, but contain different product data sets. Thus, in order for the telecommunications service provider to effectively manage its product data, it must manage both product catalogs, which is both time consuming and expensive, resulting in an opportunity for consolidation.

Accordingly, to consolidate the two product catalogs, an API 306 corresponding to a REST architecture (308) may be generated by the processing device 212 to effectively hide the implementation details of the of the product catalogs (A 302 and A' 306). Additionally, the API 306 exposes the product catalog data (e.g. product data definitions) to a requesting application 310. Once the relationship between the API 306 and the requesting application 310 is established, the two product catalogs A 302 and A' 304 may be coalesced into one single product catalog system and/or database. More particularly, all of the products in product catalog A 302 may be re-represented in memory, in the service. Doing so allows for quick data access (essentially at memory-speeds) and reduces the need for continuous access from the product catalog A 302, and further, acts as a buffer against potential product catalog downtime.

Importantly, the connection and/or configuration between the API 306 and the requesting application 310 do not have to change, effectively enabling the consolidation of business assets. While the above example was discussed in the context of two product catalogs and further in accordance with a REST architecture, it is contemplated that any type of business assets and any combination (tens, hundreds, or thousands) of business assets may be consolidated using any type of generic API implementation other than REST.

Figure 4:
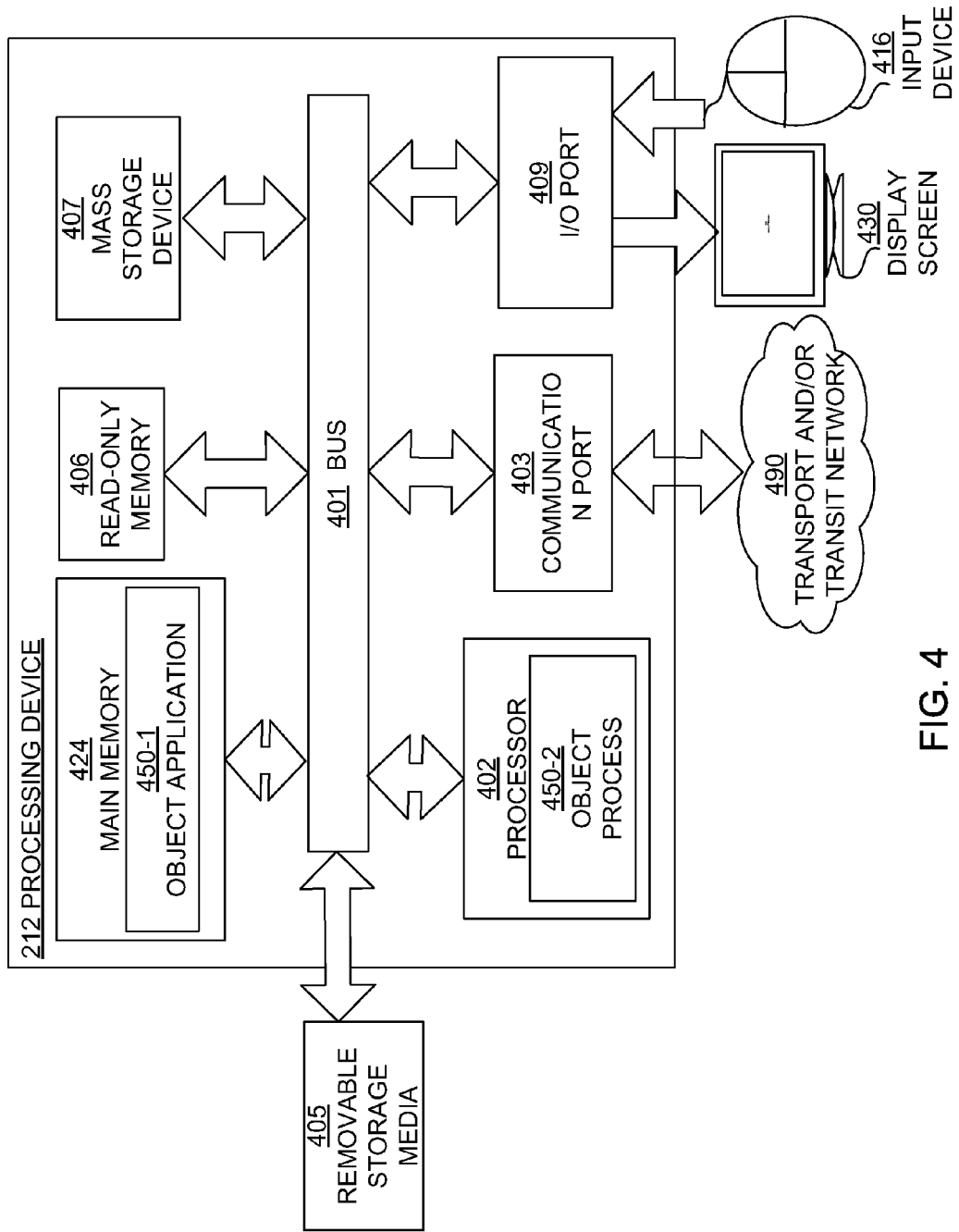
FIG. 4 is an example block diagram of an processing device, according to aspects of the present disclosure.

FIG. 4 is example schematic diagram of a computing system implementing a processing device 212 that may be use to perform business asset consolidation, according to one embodiment. The computing system for the processing device 212 includes a bus 401 (i.e., interconnect), at least one processor 402, at least one communication port 403, a main memory 404, a removable storage media 405, a read-only memory 406, and a mass storage device 407. Processor(s) 402 can be any known processor, such as, but not limited to, an Intel® Itanium® or Itanium 2® processor (s), AMD® Opteron® or Athlon MP® processor(s), or Motorola® lines of processors. Communication port 403 can be any of an RS-232 port for use with a modem based dial-up connection, a 10/100 Ethernet port, a Gigabit port using copper or fiber, or a USB port. Communication port(s) 403 may be chosen depending on a network such as a Local Area Network (LAN), a Wide Area Network (WAN), or any network to which the computer system 100 connects. The processing device 112 may be in communication with peripheral devices (e.g., display screen 430, input device 416 via Input/Output (I/O) port 409.

Main memory 404 can be Random Access Memory (RAM) or any other dynamic storage device(s) commonly known in the art. Read-only memory 406 can be any static storage device(s) such as Programmable Read-Only Memory (PROM) chips for storing static information such as instructions for processor 402. Mass storage device 407 can be used to store information and instructions. For example, hard disks such as the Adaptec® family of Small Computer Serial Interface (SCSI) drives, an optical disc, an array of disks such as Redundant Array of Independent Disks (RAID), such as the Adaptec® family of RAID drives, or any other mass storage devices, may be used.

Bus 401 communicatively couples processor(s) 402 with the other memory, storage and communications blocks. Bus 401 can be a PCI/PCI-X, SCSI, or Universal Serial Bus (USB) based system bus (or other) depending on the storage devices used. Removable storage media 405 can be any kind of external hard drives, floppy drives, IOMEGA® Zip Drives, Compact Disc-Read Only Memory (CD-ROM), Compact Disc-Re-Writable (CD-RW), Digital Video Disk-Read Only Memory (DVD-ROM), etc.

Embodiments herein may be provided as a computer program product, which may include a machine-readable medium having stored thereon instructions which may be used to program a computer (or other electronic devices) to perform a process. The machine-readable medium may include, but is not limited to, floppy diskettes, optical discs, CD-ROMs, magneto-optical disks, ROMs, RAMs, erasable programmable read-only memories (EPROMs), electrically erasable programmable read-only memories (EEPROMs), magnetic or optical cards, flash memory, or other type of media/machine-readable medium suitable for storing electronic instructions. Moreover, embodiments herein may also be downloaded as a computer program product, wherein the program may be transferred from a remote computer to a requesting computer by way of data signals embodied in a carrier wave or other propagation medium via a communication link (e.g., modem or network connection).

As shown, main memory 404 is encoded with the consolidation application 450-1 that supports functionality as discussed above and as discussed further below. For example, in one embodiment, the consolidation application 450-1 may include or otherwise implement the various processes and/or instructions described herein. Consolidation application 450-1 (and/or other resources as described herein) can be embodied as software code such as data and/or logic instructions (e.g., code stored in the memory or on another computer readable medium such as a disk) that supports processing functionality according to different embodiments described herein. During operation of one embodiment, processor(s) 402 accesses main memory 404 via the use of bus 401 in order to launch, run, execute, interpret or otherwise perform the logic instructions of the consolidation application 450-1. Execution of consolidation application 450-1 produces processing functionality in consolidation process 450-2. In other words, the consolidation process 450-2 represents one or more portions of the consolidation application 450-1 performing within or upon the processor(s) 202 in the computer system 400.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

What is claimed is:

1. A consolidation system comprising: at least one processor to:
   generate an application programming interface for exposing at least two business assets to at least one requesting application; and
   consolidate the at least two business assets into at least one business asset without modifying the implementation of the application programming interface and the implementation of the at least one requesting application;
   wherein the at least two business assets includes a first data base and a second database and wherein the processor to consolidate the first database and the second database comprises the processor configured to:
   merge data between the first database and the second database second database to generate a single dataset;
   store the single dataset within a single database; and
   disassociate the first database and the application programming interface so that the application programming interface no longer exposes the first database to the at least one requesting application,
   wherein the application programming interface is implemented according to a representational state transfer software architecture; and
   wherein the application programming interface is immutable and wherein application programming interface comprises a set of API calls corresponding to any requests of the at least one requesting application.

2. The system of claim 1, wherein the at least one requesting application is a graphical user-interface implemented to present data stored within the at least two business assets.

3. The system of claim 1, wherein application programming interface exposes compression algorithms for compressing data corresponding to the at least two business assets.

4. A method for enabling business consolidation comprising:
   generating, at at least one processor, an application programming interface for exposing at least two business assets to at least one requesting application; and
   consolidating, at the at least one processor, the at least two business assets into at least one business asset without modifying the implementation of the application programming interface and the implementation of the at least one requesting application;
   wherein the at least two business assets includes a first data base and a second database and wherein to consolidate the first database and the second database comprises:
   merging data between the first database and the second database to generate a single dataset;
   storing the single dataset within a single database; and
   disassociating the first database and the application programming interface so that the application programming interface no longer exposes the first database to the at least one requesting application;
   wherein the application programming interface is implemented according to a representational state transfer software architecture; and
   wherein the application programming interface is immutable and wherein application programming interface comprises a set of API calls corresponding to any requests of the at least one requesting application.

5. The method of claim 4, wherein the at least one requesting application is a graphical user-interface implemented to present data stored within the at least two business assets.

6. The method of claim 4, wherein application programming interface exposes compression algorithms for compressing data corresponding to the at least two business assets.

7. A non-transitory computer readable medium encoded with instructions for enabling business consolidation, the instructions, executable by a processor, to perform a method comprising:

generating an application programming interface for exposing at least two business assets to at least one requesting application; and consolidating the at least two business assets into at least one business asset without modifying the implementation of the application programming interface and the implementation of the at least one requesting application;

wherein the at least two business assets includes a first data base and a second database and wherein to consolidate the first database and the second database comprises:

merging data between the first database and the second database to generate a single dataset;

storing the single dataset within a single database; and disassociating the first database and the application programming interface so that the application programming interface no longer exposes the first database to the at least one requesting application;

wherein the application programming interface is implemented according to a representational state transfer software architecture; and wherein the application programming interface is immutable and wherein application programming interface comprises a set of API calls corresponding to any requests of the at least one requesting application.

8. The non-transitory computer readable medium of claim 7, wherein the at least one requesting application is a graphical user-interface implemented to present data stored within the at least two business assets.

9. The non-transitory computer readable medium of claim 7, wherein application programming interface exposes compression algorithms for compressing data corresponding to the at least two business assets.

* * * * *